United States Patent [19]
Goodwin, III et al.

[11] Patent Number: 6,009,538
[45] Date of Patent: Dec. 28, 1999

[54] SYSTEM AND METHOD OF REPORTING A STATUS OF ANOTHER SYSTEM THROUGH AN ELECTRONIC PRICE LABEL SYSTEM

[75] Inventors: John C. Goodwin, III, Suwanee; Andrew J. Adamec, Duluth; Cheryl K. Harkins, Lawrenceville, all of Ga.

[73] Assignee: NCR Corporation, Dayton, Ohio

[21] Appl. No.: 08/837,661

[22] Filed: Apr. 22, 1997

[51] Int. Cl.$^6$ .................................................. G06F 11/00
[52] U.S. Cl. ........................... 714/25; 714/46; 705/16; 705/20; 705/23
[58] Field of Search ................ 395/183.01, 182.22, 395/184.01, 185.1, 185.01; 705/16, 17, 20, 21, 22, 23, 24; 714/25, 46, 47, 48, 57

[56] References Cited

U.S. PATENT DOCUMENTS

| | | | |
|---|---|---|---|
| 4,435,767 | 3/1984 | Nakatani et al. | 364/405 |
| 4,878,049 | 10/1989 | Ochiai et al. | 371/5.5 |
| 5,099,480 | 3/1992 | Murata | 371/20.4 |
| 5,315,093 | 5/1994 | Stewart | 235/381 |
| 5,331,642 | 7/1994 | Valley et al. | 371/5.2 |
| 5,390,324 | 2/1995 | Burckhardtt et al. | 395/575 |
| 5,513,185 | 4/1996 | Schmidt | 371/5.5 |
| 5,663,963 | 9/1997 | Goodwin, III | 371/5.1 |
| 5,715,393 | 2/1998 | Naugle | 395/200.11 |
| 5,734,839 | 3/1998 | Enoki et al. | 395/220 |
| 5,736,967 | 4/1998 | Kayser et al. | 345/1 |
| 5,835,700 | 11/1998 | Carnonneau et al. | 395/183.2 |

FOREIGN PATENT DOCUMENTS

| | | | |
|---|---|---|---|
| 0396414 | 11/1990 | European Pat. Off. | H04M 11/02 |
| 0710916 | 5/1996 | European Pat. Off. | G06F 17/60 |
| 0755011 | 1/1997 | European Pat. Off. | G06F 11/22 |
| 9705556 | 2/1997 | WIPO | G06F 17/60 |

*Primary Examiner*—Dieu-Minh T. Le
*Attorney, Agent, or Firm*—Paul W. Martin

[57] ABSTRACT

A system and method of reporting a status of another system through an electronic price label (EPL). The system includes the EPL and a computer coupled to the EPL which monitors the status of the second system and causes the EPL to display a status message indicating the status of the second system. The second system may include a POS system, credit authorization system, or any other in-store system.

2 Claims, 6 Drawing Sheets

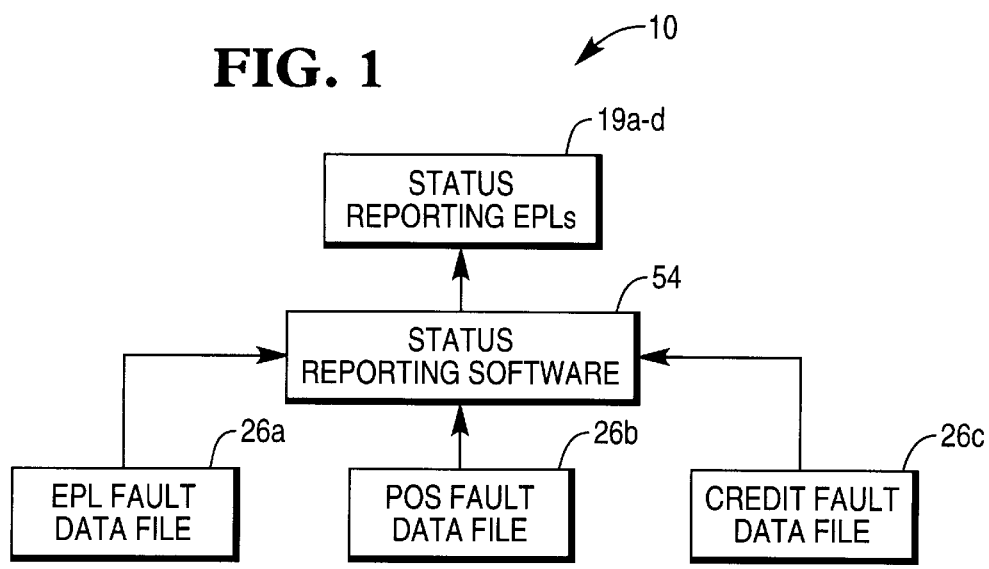
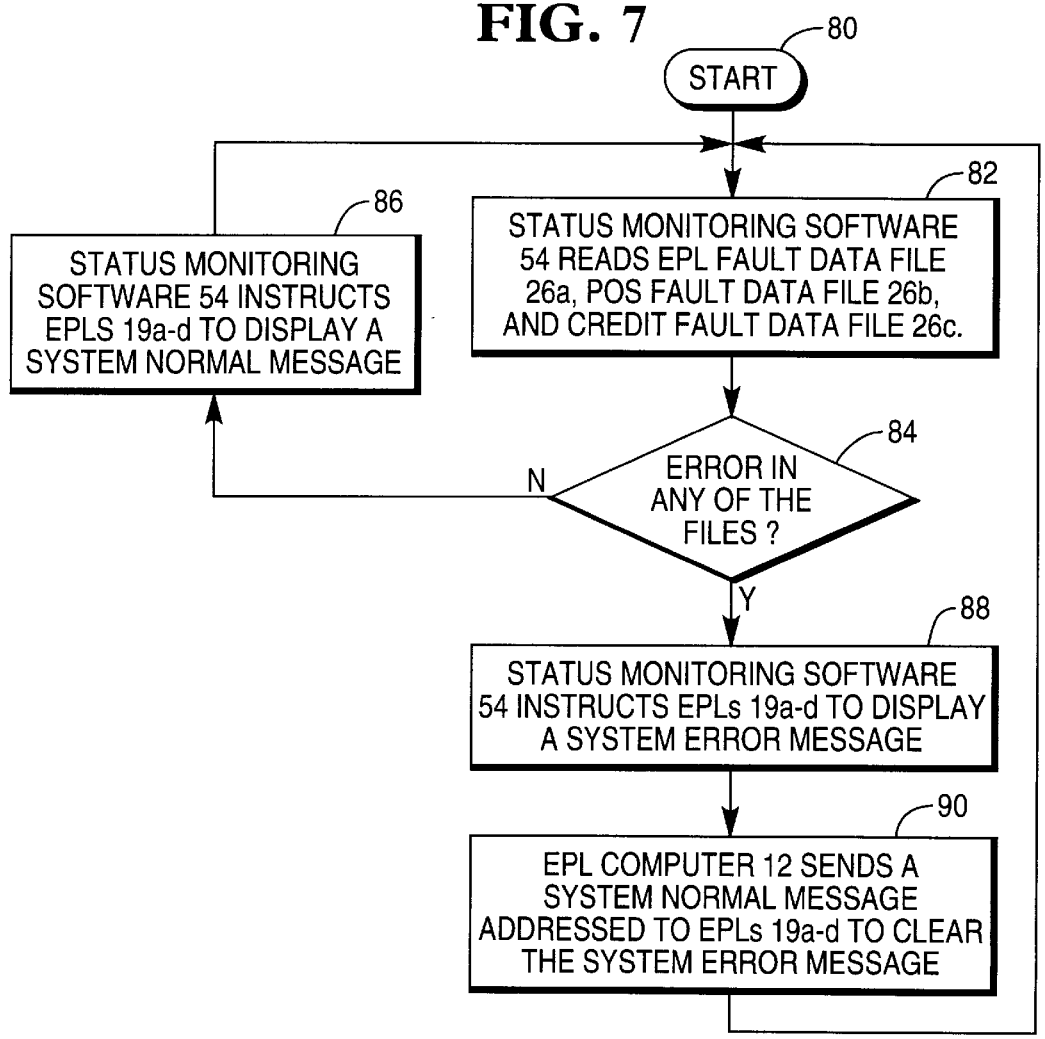

FIG. 5

| Test | Purpose | Method |
| --- | --- | --- |
| Port test | Test ports 31a-b | Perform loop test on ports 31a-b |
| CBS test | Test CBSs 15a-d | Query CBSs 15a-d and obtain return signals |
| CBS transmit test | Test CBS circuitry 39 and CBS transmit antenna 37 | Query CBSs 15a-d for transmitted signal level |
| CBS receive test | Test CBS circuitry 39 and CBS receive antennas 38 | Query CBSs 15a-d for connectivity and LNA 45 power consumption |
| EPL battery level test | Test EPL battery voltage | Query EPLs 18 for battery level |
| EPL sumcheck test | Test displayed EPL price and/or information | Compare EPL display price with EPL checksum stored in EPL data file 28 |
| EPL LCD glass test | Test display glass 49 | Query EPL circuitry 48 for LCD status |
| EPL in store and working test | Determine whether computer 12 can communicate with EPLs 18 and whether EPLs 18 are operating | Interrogate EPLs 18 and obtain return signal |
| EPL circuitry test | Test EPL circuitry 48 | Query EPL circuitry 48 and obtain return signal |
| Power supply test cable test | Test power supplies 16a, 16b, and cable 35a-c (assuming no alternate master CBS in this bank of CBSs) | Determine failure of CBSs 15a-d and compare to EPL system configuration file 27 to determine failure of either power supply 16a-b or cable 35a-c |
| First cable test | Test integrity of cable 33a | Determine failure of CBS 15a, use alternate master CBS 15c to determine whether communication with CBS 15a is possible |
| Cable high error rate test | Test integrity of cables 35a-c | Query CBS data 41 from CBSs 15a-d, determine whether any of files 41 contains excessively high error rates |
| EPL system configuration test | Test CBSs 15a-d for bad store location (which may occur if shelves are moved) | Monitor rate of false postives within CBS data 41, determine whether false positive rate is excessive |

FIG. 6

| Monitored Fault | Monitoring Action | Reported Recommendation |
|---|---|---|
| EPL battery voltage low | Perform EPL battery level test | Replace battery or EPL if level is too low |
| EPL display faulty | Perform EPL LCD glass test | Replace EPL |
| EPL circuitry faulty | Perform EPL circuitry test | Replace EPL |
| EPL not working or not in store | Perform EPL in store and working test | Replace EPL |
| All CBSs failure | Perform port test, CBS test, and power supply cable test, and first cable test | Replace port if port failure, replace CBS if CBS failure, replace power supply if power supply failure, replace cable 33a if cable 33a failure, replace cable 31a if port 31a failure |
| Single CBS failure | Perform CBS test | Replace CBS |
| Group of CBSs failure | Perform power supply test/ cable test, high error test, and CBS test | Replace power supply if power supply failure, replace cable 35b if cable 35b failure, replace CBS if one or more CBSs failure, replace cables 35a-c if one or more of cables 35a-c failure |
| CBS transmit antenna failure | Perform CBS transmit test | Replace CBS transmit antenna first, then CBS if necessary |
| CBS receive antenna failure | Perform CBS receive test | Replace CBS receive antenna first, then CBS if necessary |
| High retry error rates | Perform cable high error rate test | Replace one or more of cables 35a-c |
| Checksum filename | Compare EPL checksum with calculated checksum | Initiate price change |

SYSTEM AND METHOD OF REPORTING A STATUS OF ANOTHER SYSTEM THROUGH AN ELECTRONIC PRICE LABEL SYSTEM

CROSS-REFERENCE TO RELATED APPLICATIONS

The present application is related to co-pending application Ser. No. 08/503,144, entitled "METHOD FOR DETECTING AND REPORTING FAILURES IN ELECTRONIC PRICE LABEL SYSTEMS", having as inventor, John Goodwin.

BACKGROUND OF THE INVENTION

The present invention relates to system monitoring and status reporting systems, and more specifically to a system and method of reporting a status of another system through an electronic price label (EPL) system.

Retail establishments typically include a plurality of separate computer systems or networks. Each of these systems has a central back-office server. For example, the point-of-sale (POS) system provides item price and other information to checkout terminals after items are scanned at the checkout terminals.

Another system is the credit authorization system which allows a POS system to clear credit card and check purchases.

Another system is the EPL system. EPL systems typically include a plurality of EPLs for each merchandise item in a retail establishment. EPLs typically display the price of corresponding merchandise items on retail establishment shelves and are typically attached to a rail along the leading edge of the shelves. A retail establishment may contain thousands of EPLs to display the prices of the merchandise items. The EPLs are coupled to a central server from where information about the EPLs is typically maintained in an EPL data file. Price information displayed by the EPLs is obtained from the PLU file.

Retail establishment personnel must monitor the condition of these individual networks in the back office where the computers reside. Thus, when personnel are working in the merchandise and produce aisles, they do not notice system errors when they occur.

Therefore, it would be desirable to provide a method of reporting the status of the one or more systems, including the EPL system, at many locations throughout a retail establishment. It would further be desirable to use the EPLs to display system status messages for these systems.

SUMMARY OF THE INVENTION

In accordance with the teachings of the present invention, a system and method of reporting a status of another system through an electronic price label system is provided.

The EPL system monitors the status of the one system and causes an EPL to display a status message indicating the status of the second system. The second system may include a POS system, credit authorization system, or any other in-store system.

Under the reporting method, the EPL computer reads fault data created by the one system to determine the status of the one system, sends a data change message to an EPL within the EPL system to display a status message including a first message if the status reflects a normal operating condition and a second message if the status reflects a faulty operating condition. If the status reflects a faulty operating condition, the EPL computer may additionally clear the status message under operator command. Alternatively, the operator may manually clear the status message by engaging a switch in the EPL.

It is accordingly an object of the present invention to provide a system and method of reporting a status of another system through an EPL system.

It is another object of the present invention to provide a system and method of reporting status of a system through an EPL system which is capable of monitoring the status of several different retail systems, including an EPL system, a point-of-sale (POS) system, and a credit authorization and reporting system.

It is another object of the present invention to provide a system and method of reporting a status of another system through an EPL system that causes predetermined EPLs to display status and error messages.

It is another object of the present invention to provide a system and method of reporting a status of another system through an EPL system that causes predetermined EPLs to display time.

It is another object of the present invention to provide a method of monitoring applications such as transaction applications which communicate with a host system for PLU changes, bad check file updates, frequent shopper program updates, etc., and scale management applications, which download information to in-store scales for local bar code production (like at the deli counter).

It is another object of the present invention to provide a method of monitoring in-store systems, such as air conditioning systems and freezer and cooler systems.

It is another object of the present invention to provide a method of reporting system status using a noisemaker within an EPL.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 1 is a block diagram including a plurality of retail systems whose current conditions are reported using the method of the present invention;

FIG. 5 is a chart of EPL tests performed, purpose of tests, and methods of detection;

FIG. 6 is a chart of EPL faults monitored, actions, and recommendations; and

FIG. 7 is a flow chart illustrating the method of the present invention.

DETAILED DESCRIPTION OF THE PREFERRED EMBODIMENT

Figure 2A:
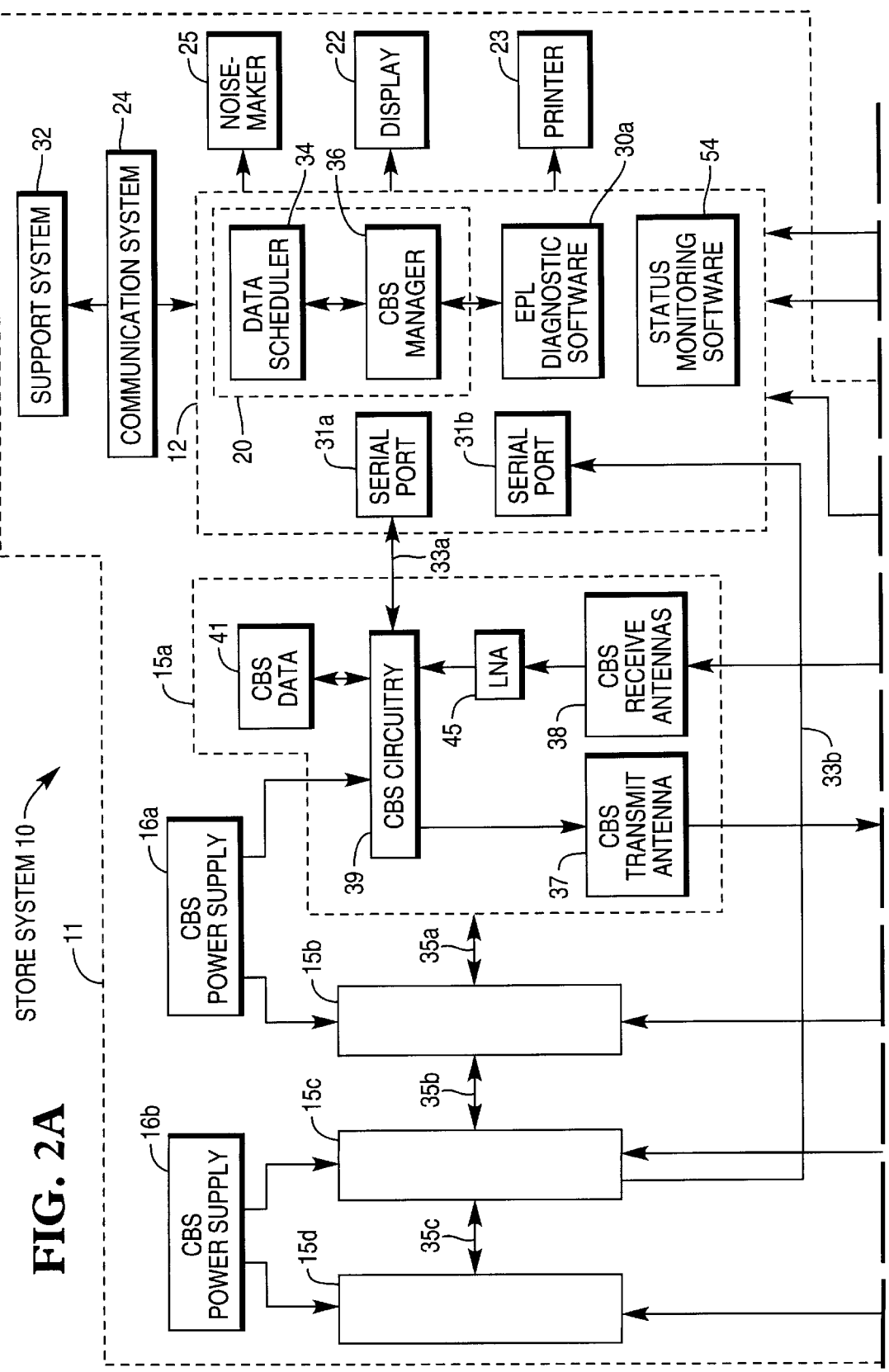
FIGS. 2A and 2B are a more detailed view of the diagram of FIG. 1, including a more detailed view of an EPL system.
Figure 2B:
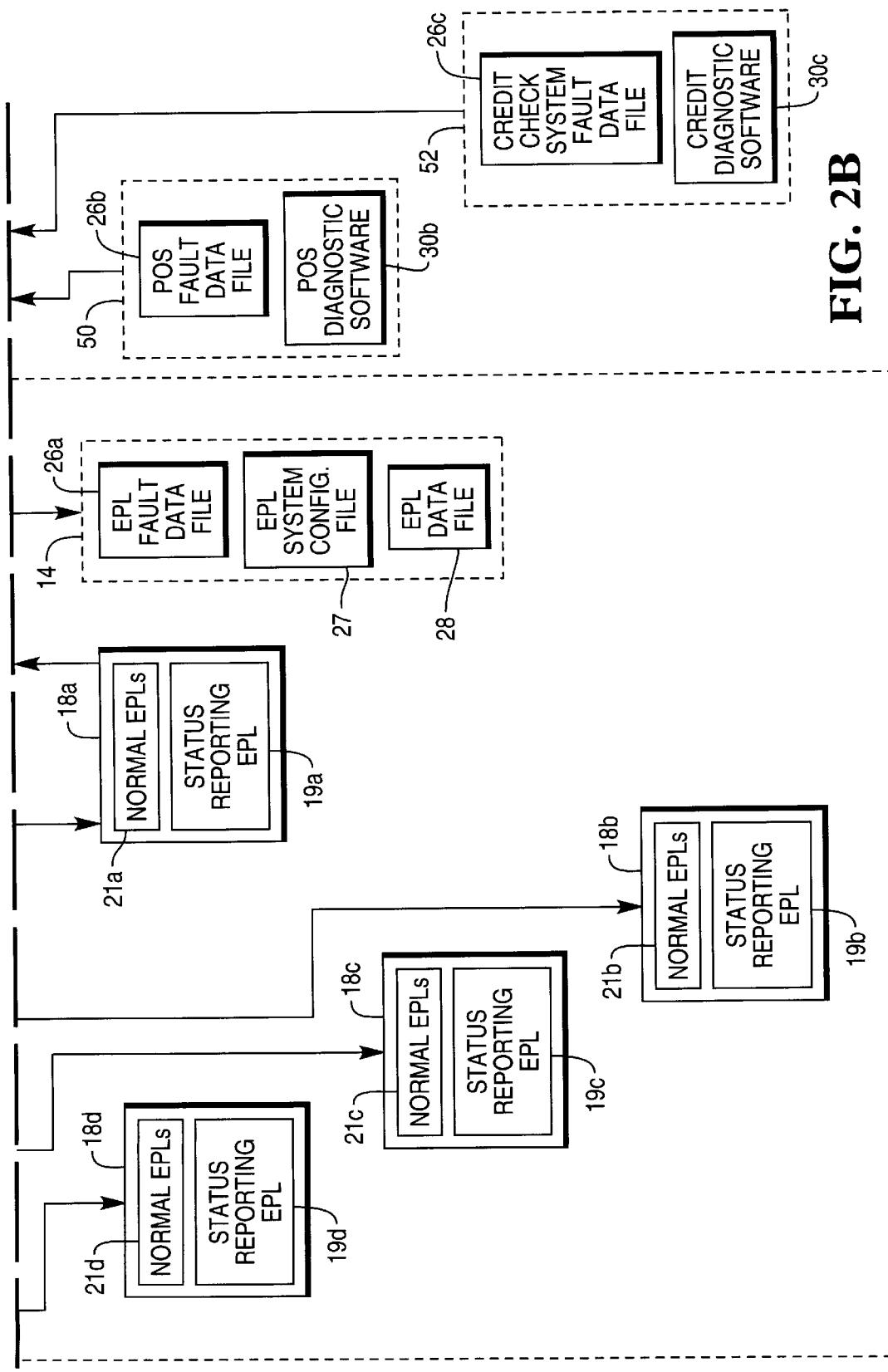

Referring now to FIGS. 1 and 2, retail store system 10 primarily includes EPLs 18a–d, EPL fault data file 26a, and status reporting software 54. EPL fault data file 26a is created by EPL diagnostic software 30a within an EPL system 11 (FIGS. 2A and 2B).

EPLs 18a–d include "normal" EPLs 21a–d and status reporting EPLs 19a–d. Normal EPLs are mounted to shelves and displays for the purpose of conveying price and other information to customers. Status reporting EPLs 19a–d may be mounted throughout a store or carried by employees for the purpose of reporting store system status information to employees.

Status reporting software 54 periodically reads EPL fault data file 26a and causes status messages to be displayed by EPLs 19a–d, including messages indicative of problems detected by EPL diagnostic software 30a.

Status reporting software 54 preferably resides in EPL system 11.

Status reporting software 54 may also periodically read fault data files from other systems. For example, if a point-of-sale (POS) system 50 (FIGS. 2A and 2B) were to store system status messages in a POS fault data file 26b, status reporting software 54 would periodically read POS fault data file 26b and cause EPLs 19a–d to display the status of POS system 50. In such a case, EPL system 11 and POS system 50 would be connected, preferably through a network.

In order to read fault data files from other systems, status reporting software 54 understands multiple file formats.

Also shown is a credit fault data file 26c which is created by a credit authorization system 52 (FIGS. 2A and 2B) within the retail establishment. Through a network connection to credit authorization system 52, status reporting software 54 reads credit fault data file 26c in a similar manner.

Status reporting EPLs 19a–d display status messages which alert retail establishment personnel to a problem in any of the monitored systems. EPLs 19a–d are included within the total group of installed EPL, EPLs 18a–d (FIGS. 2A and 2B). Preferably, status reporting EPLs 19a–d are spread out throughout the retail establishment. An EPL may even be carried by a store employee as a pager.

With reference to FIGS. 2A and 2B, EPL system 11 includes computer 12, storage medium 14, communication base stations (CBSs) 15a–d, CBS power supply 16a–b, EPLs 18a–d, display 22, printer 23, communications circuitry 24, and noisemaker 25. Server 50 and server 52 could share the same CPU and storage system.

Computer 12 executes EPL control software 20, EPL diagnostic software 30a, and fault data file monitoring software 54.

EPL control software 20 records, schedules, and transmits price changes to EPLs 18a–d through CBSs 15a–d, and receives and analyzes status messages from EPLs 18a–d through CBSs 15a–d. EPL control software 20 also maintains and uses EPL data file 28, which contains item information, identification information, item price verifier information, and status information for each of EPLs 18a–d.

EPL control software 20 primarily includes data scheduler 34 and CBS manager 36. Data scheduler 34 schedules EPL price change messages to be sent to EPLs 18a–d through CBSs 15 and 16.

CBS manager 36 schedules the actual transmission of price change messages to EPLs 18a–d and the reception of status messages from EPLs 18a–d for predetermined time slots.

EPL diagnostic software 30a automatically monitors EPL system 11 for failures, logs failures in EPL fault data file 26a, displays failures on display 22, prints failure reports using printer 23, and reports failures and read faults that have been logged in EPL fault data file 26a by other applications to support system 32 using communication circuitry 24. EPL diagnostic software may also cause noisemaker 25 to alert users of a failure. Noisemaker 25 preferably includes a speaker. Display 22, printer 23, and noisemaker 25 are preferably coupled to computer 12.

Computer 12 may include one or more communication ports 31a–b.

Storage medium 14 is preferably a fixed disk drive. Storage medium 14 stores EPL fault data file 26a, EPL system configuration file 27, and EPL data file 28. EPL system configuration file tells computer 12 how system 11 is configured, i.e., the addresses of EPL system components and there location relative to other components within system 11.

CBSs 15a–d are connected together in series by cables 35a–c. Here, only four CBSs are shown. CBSs 15a–d each include one transmit antenna 37 and up to four receive antennas 38 for transmitting and receiving messages between CBSs 15a–d and EPLs 18a–d.

One or more of CBSs may receive power from a single power supply. Here, CBSs 15a–b receive power from CBS power supply 16a, and CBSs 15c–d receive power from CBS power supply 16b.

CBSs 15a–d each include CBS circuitry 39 which controls operation of each CBS. In CBSs 15a–d, circuitry 39 maintains memory-based CBS data 41. Within CBSs 15b–d, CBS data 41 contains error rates of communication between CBS 15a and each of the other CBSs 15b–d. Within CBS 15a, CBS data 41 contains error rates of communication between CBS 15a and computer 12. When CBS 15c is designated a master as explained below, CBS data 41 contains error rates of communication between CBS 15c and computer 12. Excessively high error rates can signal a bad connection in cables 33a–b, or cables 35a–c.

CBSs 15a–d also include a low-noise amplifier (LNA) 45 which amplifies signals received by CBS receive antennas 38 so that CBS circuitry 39 can better process the information within those signals.

One cause of CBS failure is a failure of LNA 45. To determine whether LNA 45 is faulty (failed or not connected), computer 12 transmits a status message to CBS 15a, CBS 15a transmits the status message to EPL 18a, and EPL 18a transmits a return signal to CBS 15a. If the return signal is not received by computer 12 through CBS 15a, computer 12 determines whether LNA 45 is consuming power above a predetermined minimum power level. If the power level is below the predetermined minimum power level, computer 12 transmits a fault message to support system 32.

The types of information logged within CBS data 41 include the number of messages sent to other CBSs and whether the other CBSs responded. CBS data 41 also keeps track of the number of messages sent to the EPLs and if it 'heard' anything of interest or not.

CBS 15a is a master CBS and CBSs 15b–d are slave CBSs. CBS 15a communicates directly with computer 12. An alternate master may also be designated. Here, CBS 15c is shown as an alternate master which communicates directly with computer 12 through cable 33b when CBS 15a is down (not working properly), its communication port 31a is down, or when cable 33a between CBS 15a and computer 12 is down.

Communication circuitry 24 transmits failure messages generated by EPL diagnostic software 30a to support system 32. Communication circuitry 24 is preferably a modem, but could also include network circuitry, such as a local area network (LAN) or wide area network (WAN) adapter.

Support system 32 is preferably a computer system with a modem located at the site of an EPL system vendor or EPL system technician.

POS system 50 and credit authorization system 52 include diagnostic software as well. POS system 50 includes POS diagnostic software 30b which writes errors to POS fault data file 26b. Credit authorization system 52 includes credit diagnostic software 30c which writes errors to credit fault data file 26c.

POS diagnostic software 30 monitors occurrences in a POS device and logs messages identifying any 'problems' detected. Problems include printer jams, hardware and software failures of checkout terminal, failures of displays, excessive cash in checkout terminal tills, excessively high (above void limit) voids (delete item from sale). Other problems not associated with the operation of checkout terminals include messages indicating that an item price check is needed and that customer assistance is needed (e.g., broken eggs, milk leaking).

Credit diagnostic software 30c monitors the communications link between the store and the switch. Additionally this system alerts store personnel if server 52 is unable to establish a connection.

Figure 3:
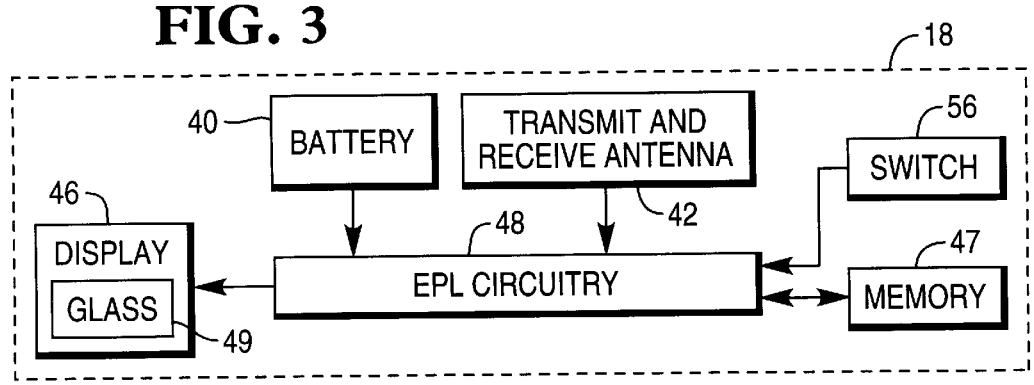
FIG. 3 is a block diagram of an EPL module.

Turning now to FIG. 3, EPLs 18a–d each include battery 40, transmit and receive antenna 42, display 46, memory 47, EPL circuitry 48, and switch 56. Since there is only one antenna 42, if antenna 42 is broken, the EPL is considered broken or lost (not in the retail establishment).

Battery 40 provides power to EPLs 18a–d. A low battery voltage is one cause for EPL malfunction and failure.

Transmit and receive antenna 42 receives price change and status messages from CBS 15a–d. Failure of antenna 42 can cause EPL 18a–d to miss price change requests from EPL control software 20.

Transmit and receive antenna 42 transmits responses to price change and status messages to CBS 15a–d. Failure of antenna 42 can prevent EPL control software 20 from verifying that price changes have been received and displayed by EPL 18a–d.

Display 46 displays price and possibly additional information. Display 46 is preferably a liquid crystal display and includes glass 49. A failure of display 46, which may include a crack in glass 49, prevents EPL 18a–d from displaying price information to customers.

Memory 47 stores price verifier information. Preferably, the price verifier information is a checksum of the displayed price.

EPL circuitry 48 controls the internal operation of EPL 18a–d. A failure within circuitry 48 can cause a total failure of EPL 18a–d.

Switch 56 allows an operator to manually clear a status message that is displayed by an EPL. Clearing may involve removing a status message from memory 47 or clearing display 46. Switch 56 is preferably a push-button switch, but other switches are also envisioned. Alerts may also be cleared by sending a message from EPL computer 12.

Figure 4:
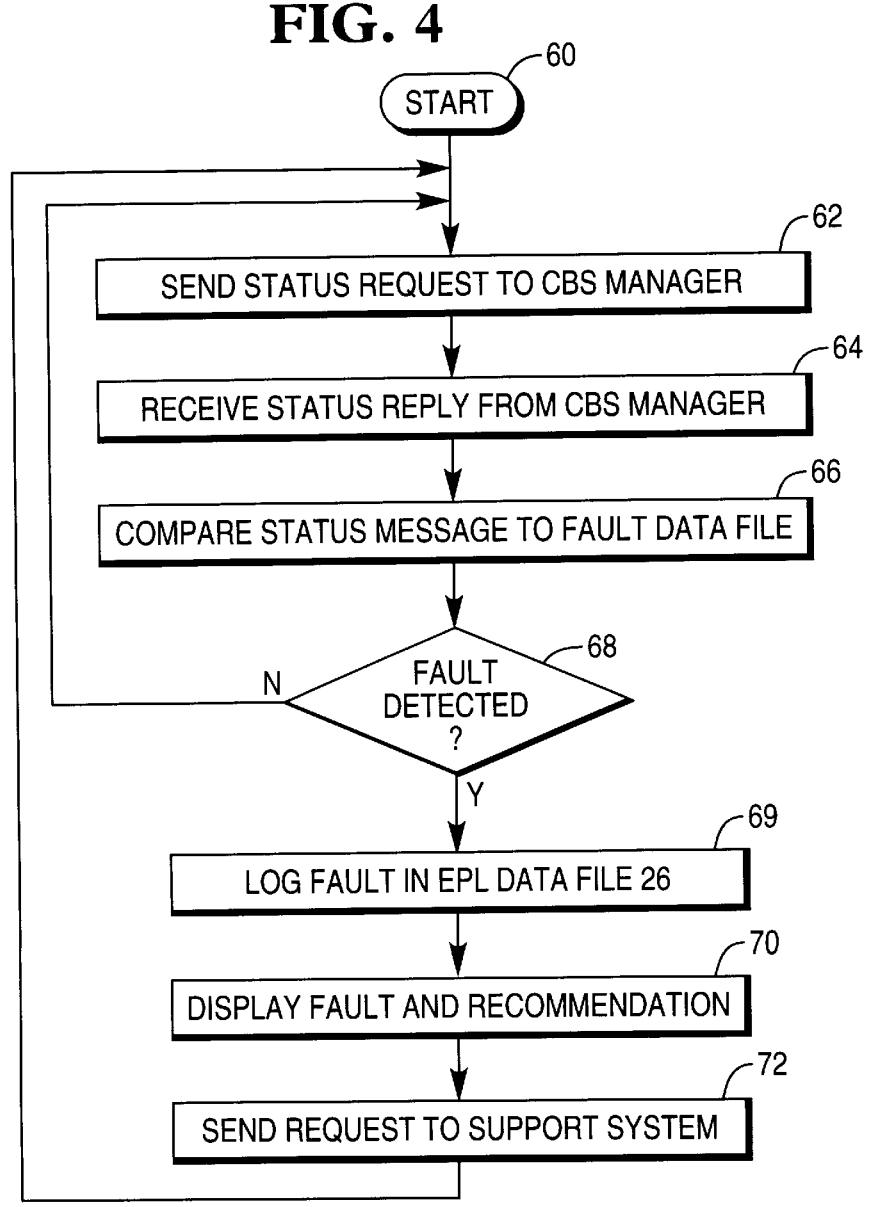
FIG. 4 is a flow diagram illustrating an EPL failure detection and reporting method.

Turning now to FIG. 4, the operation of EPL diagnostic software 30a is explained in more detail, beginning with START 60.

In step 62, EPL diagnostic software 30a periodically sends an instruction to CBS manager 36 to transmit a status request to CBSs 15a–d and EPLs 18a–d.

In step 64, EPL diagnostic software 30a receives a status reply from CBS manager 36.

In step 66, EPL diagnostic software 30a compares the status message to configuration file 27.

In step 68, EPL diagnostic software 30a determines from the comparison whether a fault has occurred. If not, then the method returns to step 62.

If a fault has been detected, EPL diagnostic software 30a logs the fault in EPL fault data file 26a.

In step 69, EPL diagnostic software 30a displays the fault condition and a recommendation on display 22. Alternatively, EPL diagnostic software may activate noisemaker 25 or cause a printer to print an error message in step 70.

In step 72, EPL diagnostic software 30a notifies retail establishment personnel and support system 32 of the problem and sends a support request containing the fault condition and recommendation to support system 32. Notification of support system 32 and retail establishment personnel could be in the form of a displayed, printed, or aural message. Preferably, display 22 is used to notify retail establishment personnel. The method then returns to step 62 to continue monitoring EPL system 11.

Advantageously, EPL diagnostic software 30a provides immediate and automatic notification of critical component failure to retail establishment personnel and to EPL technicians. Notification of non-critical component failure may be delayed.

EPL diagnostic software 30a performs tests which are listed in FIG. 5.

Examples of failures that are monitored and reported by EPL diagnostic software 30a are shown in FIG. 5.

When a fault occurs, the fault may be determined by implementing one or more tests. For example, if a CBS test on all of CBSs 15a–d indicates that all of CBSs 15a–d have failed, the failure may have been caused by any one of a plurality of causes, least probable of which are substantially simultaneous failures of CBSs 15a–d. A failure of serial port 31a is one possible cause, therefore, a port test is performed. If serial port 31a has failed, EPL diagnostic software 30a generates a support request which is sent to support system 32 by communication circuitry 24.

If serial port 31a has not failed, CBS 15a or cable 33a may have failed. A failure of either prevents messages from reaching CBSs 15b–d. To test this cause, CBS 15c is configured as the master CBS and a CBS test is performed on each CBS 15a–d. If CBS 15a passes the CBS test, then cable 33a is the likely cause of failure. EPL diagnostic software 30a generates a support request which is sent to support system 32 by communication circuitry 24.

If CBS 15a does not pass the test, and other CBSs also do not pass the test, a power supply test is performed to determine whether power supply 16a is the cause of the failure. If both CBS 15a and CBS 15b have failed, the power supply test compares the failure of CBSs 15a and 15b to EPL system configuration file 27. Since CBSs 15a and 15b are both powered by power supply 16a, a failure of power supply 16a is the likely cause. EPL diagnostic software 30a generates a support request which is sent to support system 32 by communication circuitry 24.

As another example of how the tests in FIG. 4 can be combined to diagnose faults in FIG. 6, suppose that EPL diagnostic software 30a queries EPLs 18a–d and provides a preliminary indication that one or more of EPLs 18a–d are not working or not in system 11. If only one EPL is down, then the EPL is down or the EPL is not listed in EPL data file 28.

If a plurality of EPLs 18a–d are down, then one of CBSs 15a–d is probably down since it is not probable that a plurality of EPLs 18a–d would fail substantially simultaneously. A CBS test is performed on the CBS associated with the down EPLs. If the CBS is down, EPL diagnostic software 30a generates a support request which is sent to support system 32 by communication circuitry 24.

If the CBS is not down, then only part of the CBS may be down. The transmitter portion of CBS circuitry 39 may be the likely cause. Therefore, a CBS transmit test is performed. If the CBS cannot transmit to its associated EPLs, then EPL diagnostic software 30a generates a support request which is sent to support system 32 by communication circuitry 24.

Turning now to FIG. 7, the operation of status monitoring software 54 is illustrated beginning with START 80.

In step 82, status monitoring software 54 reads EPL fault data file 26a, POS fault data file 26b, and credit fault data file 26c.

In step 84, status monitoring software 54 determines whether an error has been logged in any of EPL fault data file 26a, POS fault data file 26b, or credit fault data file 26c. If not, status monitoring software 54 instructs EPLs 19a–d to display a system normal message in step 84 and operation returns to step 82 to continue monitoring. A system normal message is one that indicates no errors have occurred. For example, the system normal message may be the current time, "OK [time]", "EPL OK", "POS OK", "CREDIT OK", or any other desirable message.

Status monitoring software 54 instructs EPL control software 20 to send a data change message addressed to EPLs 19a–d. The data change message contains the system normal message.

If status monitoring software 54 finds that an error has been logged in EPL fault data file 26a, POS fault data file 26b, or credit fault data file 26c, operation proceeds to step 88 in which status monitoring software 54 instructs EPLs 19a–d to display a system error message. A system error message is one that indicates that an error has occurred. For example, the system error message may be the time the error was discovered, "CK EPL", "CK POS", "CK CREDIT", or any other desirable message. More detail on the specific error may be determined by retail establishment personnel by examining the reports generated by diagnostic software 30a–c in each of the systems 11, 50, and 52.

Status monitoring software 54 instructs EPL control software 20 to send a data change message addressed to EPLs 19a–d. The data change message contains the system error message.

Store personnel must also be alerted to EPL system failures which prohibit communication to the status EPLs 19a–d. Status EPLs 19a–d alert store personnel to these type of failures in the following manner: Status monitoring software 54 sends EPLs 19a–d a message to display "EPL OK". Next, status monitoring software 54 schedules status EPLs 19a–d to display EPL "DOWN" by sending a promotional message. Before the "EPL DOWN" message is displayed, status monitoring software 54 delays the promotional message by sending another scheduled promotional message. This process is repeated until a critical EPL system failure occurs, such as failure of CBS power supplies 16a–b. Failures of CBS power supplies 16a–b causes all EPL radio frequency communication to cease, and status EPLs 19a–d will display the scheduled promotional message "EPL DOWN".

Alternative message formats are also envisioned. For example, the display format may include a combination of time and status at periodic intervals: '0815 EPL OK' and then 15 minutes later '0830 EPL OK'. This format would continue on the interval as defined (15 minutes in this case) until there is a major error in the system. If a major error were to occur at 0835, the displayed message would not change to 0845.

In step 90, EPLs 19a–d continue to display the system error message until retail establishment personnel notice the system error message on at least one of EPLs 19a–d and clear the system error message at EPL computer 12 by sending another price change message addressed to EPLs 19a–d. The price change message contains a system normal message.

Alternatively, EPLs 19a–d continue to display the system error message until retail establishment personnel monitoring EPLs 19a–d clear the system error message by pressing the button on the EPL. EPL status monitoring software 54 identifies which status EPL 19a–d acknowledged the failure, and records the time of the acknowledgment in EPL fault data file 26a. EPL status monitoring software 54 clears the system error message by sending a message to EPLs 19a–d.

Operation returns to step 82 to monitor for further errors.

EPL system 11 can continue to display system error messages in the face of system failures. The system can pre-send a generic failure message to an EPL. This present generic failure message will automatically be displayed after a certain amount of time following a failure. Thus, the system error message would be displayed even during such failures as serial port failure, 33a–b cable failures, power supply failures, EPL computer failure.

When the EPL system is partially functioning, status monitoring software 54 alerts store personnel by sending messages to EPLs 19a–d. Partial failures include CBS receive antenna failures, CBS transmit antenna failures, isolated EPL tag failures, and EPL system software failures. A partial failure may also occur when a single power supply fails in an EPL system having multiple power supplies, a cable fails but doesn't disable all CBSs, or when a single CBS fails.

Although the present invention has been described with particular reference to certain preferred embodiments thereof, variations and modifications of the present invention can be effected within the spirit and scope of the following claims.

What is claimed is:

1. A first system for reporting a status of a second system comprising:

a plurality of EPLs, including a group of EPLs which display price information and at least one EPL which displays the status of the second system; and a computer coupled to the plurality of EPLs which causes the EPLs in the group of EPLs to display the price information and which causes the one EPL to display a status message indicating the status of the second system;

wherein the second system is a POS system.

2. A first system for reporting a status of a second system comprising:

a plurality of EPLs, including a group of EPLs which display price information and at least one EPL which displays the status of the second system; and a computer coupled to the plurality of EPLs which causes the EPLs in the group of EPLs to display the price information and which causes the one EPL to display a status message indicating the status of the second system;

wherein the second system is a credit check system.

* * * * *